United States Patent [19]
Hemmati

[11] Patent Number: 5,394,439
[45] Date of Patent: Feb. 28, 1995

[54] BISDN COMPATIBLE MODEM CODEC FOR DIGITAL INFORMATION COMMUNICATION SYSTEM

[75] Inventor: Farhad Hemmati, Darnstown, Md.

[73] Assignee: Comsat Corporation, Bethesda, Md.

[21] Appl. No.: 791,057

[22] Filed: Nov. 12, 1991

[51] Int. Cl.⁶ ............................................. H04B 14/04
[52] U.S. Cl. ...................... 375/242; 332/103; 375/262; 375/280; 375/308
[58] Field of Search ............... 375/17, 25, 27, 39, 375/38, 52-54, 67; 370/19, 20, 112; 371/43, 44, 45; 332/103, 104

[56] References Cited

U.S. PATENT DOCUMENTS

| | | | |
|---|---|---|---|
| 4,941,154 | 7/1990 | Wei | 375/39 |
| 5,020,057 | 5/1991 | Taniguchi et al. | 375/112 |
| 5,056,117 | 10/1991 | Gitlin et al. | 375/39 |
| 5,115,453 | 5/1992 | Calderbank et al. | 371/43 |
| 5,128,964 | 7/1992 | Mallory | 375/39 |

OTHER PUBLICATIONS

"A B-ISDN Compatible Modem/Codec," F. Hemmati and S. Miller, presented at the Second Annual NASA Space Communications Technology Conference, Nov. 12-14, 1991, Cleveland, Ohio.

*Primary Examiner*—Stephen Chin
*Assistant Examiner*—Young Tse
*Attorney, Agent, or Firm*—Sughrue, Mion, Zinn, Macpeak & Seas

[57] ABSTRACT

A modem/codec is designed for a digital signal transmission system using a single satellite transponder. The system is capable of transmitting data of a rate of 155.52 Mbps, and is thus compatible with the BISDN rate. A codec of rate 13/15 is used, and an octal phase shift keying modem is also used. In this way, the digital signal transmission system is capable of receiving data at a rate of 155.52 Mbps over a single INTELSAT V/VA transponder with a usable bandwidth of 72 MHz.

3 Claims, 10 Drawing Sheets

3
BISON COMPATIBLE MODEM CODEC FOR DIGITAL INFORMATION COMMUNICATION SYSTEM

FIELD OF THE INVENTION:

The present invention relates to the field of digital information communications systems and, more specifically, to such systems involving the use of satellites. Even more specifically, the invention relates to such systems compatible with both satellite environments and fiber optic communication system environments.

BACKGROUND OF THE INVENTION:

Digital signal communications systems using satellites as the means for relaying the information are well known. Before being transmitted, the digital information is first subjected to a coding operation for error correction purposes (redundant check bits are added to the digital information). Also, the digital information is subjected to modulation to form channel symbols to increase the signal-to-noise ratio of the information and to increase the number of information bits conveyed by each channel symbol.

Figure 1:
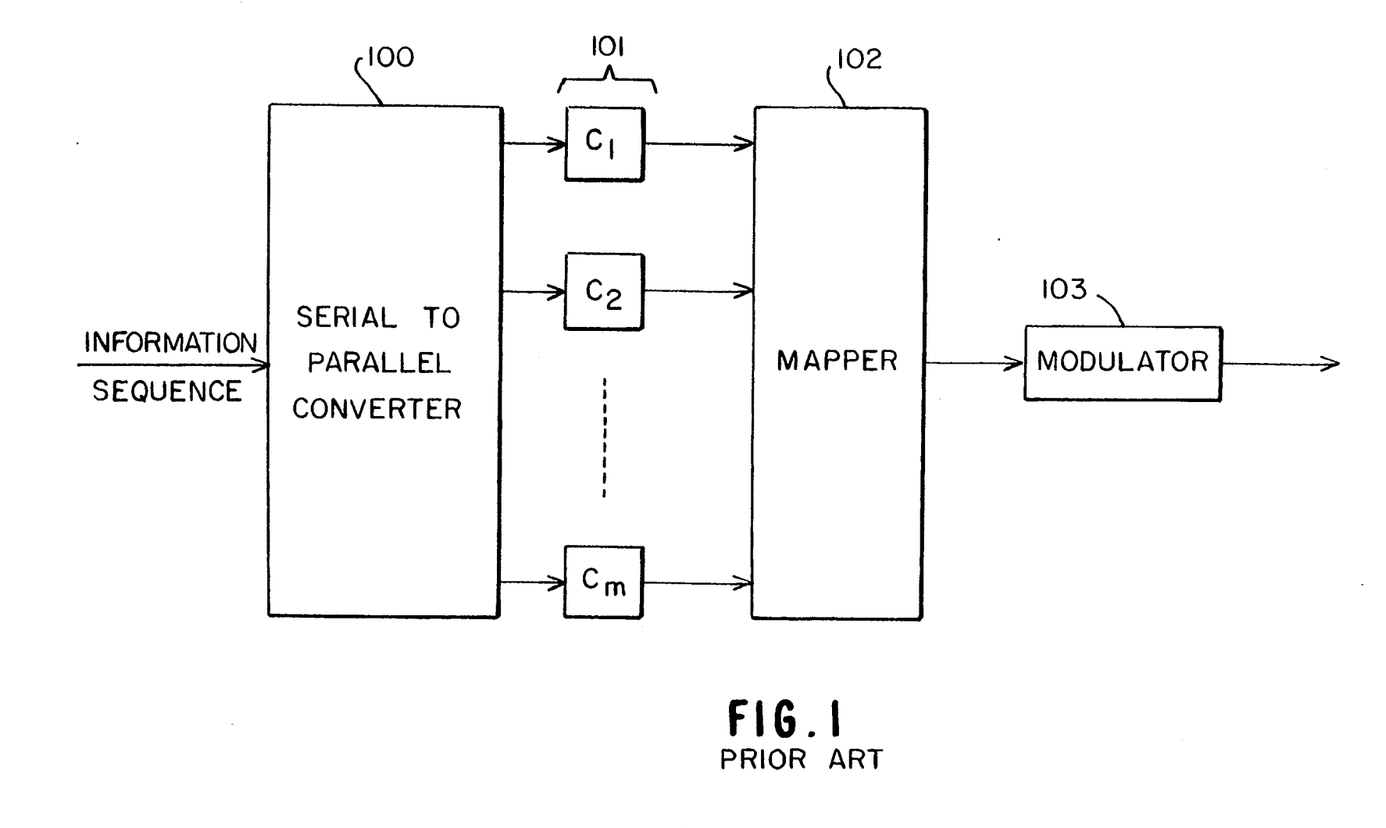
FIG. 1 shows a coded modulation system of the prior art.

A typical example of a known system using Coded Phase Shift Keying (CPSK) as the coder/modulator is shown in FIG. 1. An information sequence of a known data rate (for example, in Mbps) is input to a serial-to-parallel converter 100, where the input information sequence is divided up into a number of parallel groups of information bits. In FIG. 1, the number of groups is equal to m. Then, these parallel groups of information bits are input to m individual encoders 101 (encoders $C_1$–$C_m$). Then, the outputs of the individual encoders 101 are sent to a mapper 102 which maps the encoded information to create channel symbols for transmission over a communications channel. The symbols from mapper 102 are used by modulator 103 to provide a carrier having a different phase for each symbol, the selected phase being dependent upon the output of mapper 102.

Figure 2:
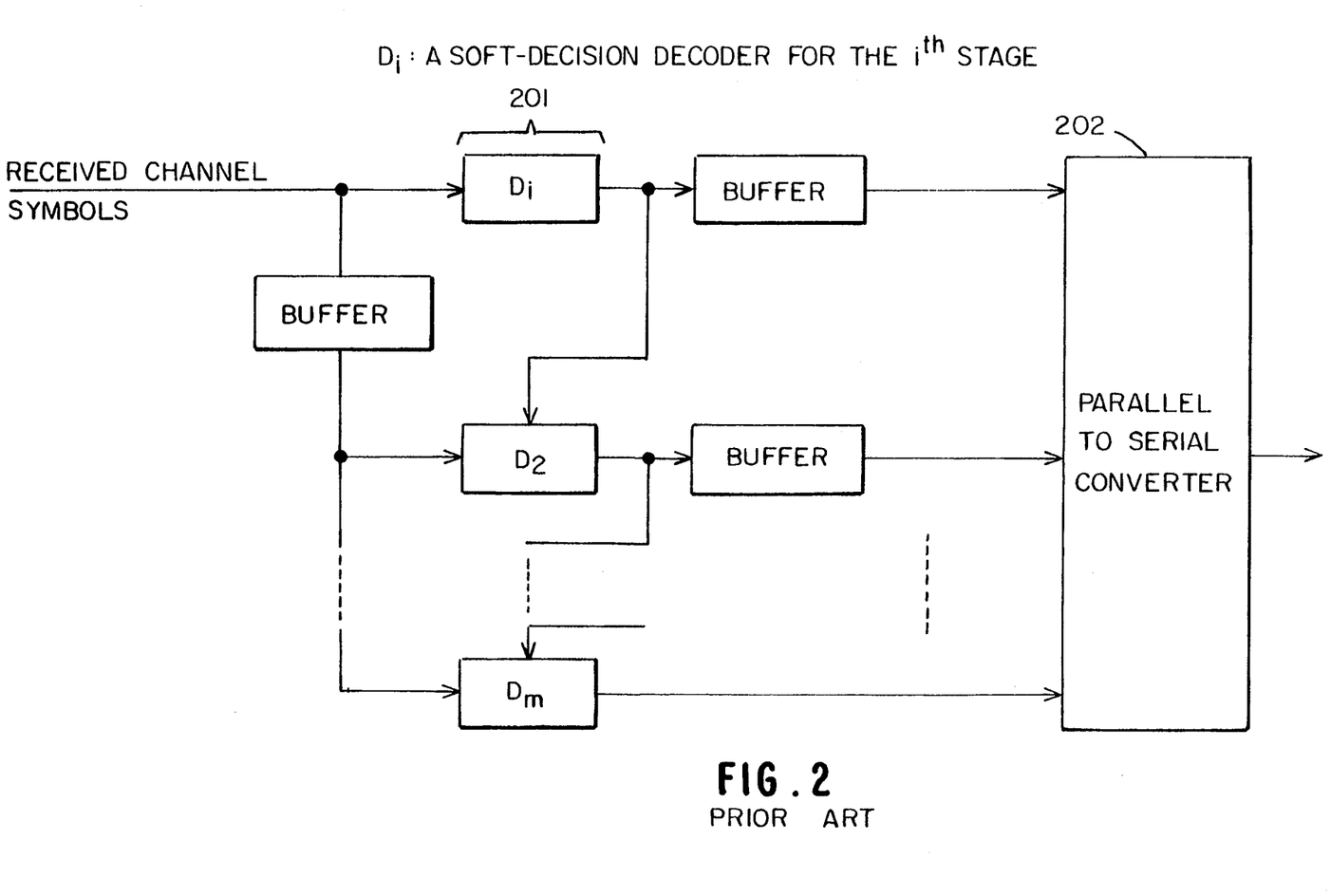
FIG. 2 shows a multi-stage decoding procedure of the prior art.

Also well known, is the decoder/demodulator arrangement of FIG. 2, which is the counterpart of the encoder/modulator arrangement of FIG. 1. In FIG. 2, the received channel symbols (after PSK demodulation) are input to individual decoders 201, where the information is decoded in a well known fashion and sent to parallel- to-serial converter 202, where the information is recombined into a serial digital information data stream. In this way, the information sequence which was originally input to serial-to-parallel converter 100 of FIG. 1 is substantially recovered at the output of parallel-to-serial converter 202 of FIG. 2.

In the above-described FIGS. 1 and 2, the specific rates of the encoders/decoders are chosen in order to accommodate an expected information sequence bit rate. For example, in FIG. 1, if an information sequence bit rate of 100 Mbps is expected, the serial-to-parallel converter 100 could be set to divide the information sequence into, for example, m=10 parallel bit streams, each bit stream having 10 Mbps as a data rate. Then, at the parallel-to-serial converter 202 of FIG. 2 at the receive end, the information would be recombined into the original 100 Mbps data rate.

An alternative to sending information by satellite is the use of an optical network, for example, a fiber optic network. The synchronous optical network (SONET) is a family of interfaces for use primarily in optical networks. The SONET standard is designed to specify how optical signals would be transported between a number of different vendors' equipment and networks. The SONET standard, among several other specifications, provides an interface to broadband integrated digital networks (B-ISDN). B-ISDN provides broadband services, such as broadcast TV, high definition TV, transmission of database files at a high data rate, etc. The standard line bit rate of OC-3 (Optical Carrier Level 3) in the SONET hierarchy is 155.52 Mbps (R. Ballart and Y-C Ching, "SONET: Now It's the Standard Optical Network", IEEE Communications Magazine, March 1989.), which equals the standard bit rate for B-ISDN.

Given the high reliability of satellites, it is to the advantage of network operators to have available B-ISDN compatible economical links via the INTELSAT satellite system, by using only one 72 MHz transponder. Such satellite links can interconnect B-ISDN networks and, furthermore, can provide early introduction of B-ISDN prior to completion of the entire terrestrial network. Moreover, in optical fiber networks, satellites can also act as a "safety valve". That is, in the case of fiber failure network congestion, traffic can be bypassed through a satellite channel on a demand-assigned basis.

Current INTELSAT V/VA TDMA links use QPSK modulation, with a transmission rate of 60 Msymbol/s. The INTELSAT V/VA system has a transponder frequency spacing of 80 MHz, and a usable bandwidth of 72 Mhz per transponder. Channel symbol rates higher than 60 Msymbol/s can result in considerable degradation in the bit error rate (BER) performance, because of the intersymbol interference (ISI) generated by satellite multiplexing filters and adjacent channel interference (ACI) from the adjacent transponders. With a forward error correction coding (FEC) of rate 7/8, the bandwidth efficiency of the QPSK TDMA system is about 1.31 bits/s/Hz of the allocated bandwidth.

A recently developed coded octal phase shift keying (COPSK) modem, with a transmission rate of 60 Msymbol/s, supports an information rate of 140 Mbps, and has been field tested to demonstrate restoration of the TAT-8 fiber optical cable by satellite. The implemented 140 Mbps modem/codec consists of a 16-state trellis code of rate 7/9 and an octal PSK (OPSK) modem (F. Hemmati and R. Fang, "Low Complexity Coding Methods for High-Data-Rate Channels", Comsat Technical Review, Vol. 16, No. 2, Fall 1986, pp. 425–447). Bandwidth efficiency of the 140 Mbps COPSK system is 1.75 bits/s/Hz of the allocated bandwidth, which is an improvement of 33% over the bandwidth efficiency of the QPSK TDMA system.

Coded OPSK Modulation Techniques

The area of power and bandwidth efficient coded modulation techniques has been of great research interest for several years. In addition to the class of coded continuous phase frequency shift keying (CPFSK) modulation schemes, research in this area has focused on two closely related directions now known as Ungerboeck codes and Imai-Hirakawa codes.

Ungerboeck Codes

In 1982 Ungerboeck introduced the concept of "set partitioning" and applied this idea to construct bandwidth efficient trellis codes (G. Ungerboeck, "Channel Coding with Multilevel/Phase Signals", IEEE Transactions on Information Theory, Vol IT-28, No. 1, January 1982, pp. 55–67.). A properly designed trellis code can provide significant coding gain over an uncoded modulation system with little or no bandwidth expansion. Coding gains of about 3 dB can be readily achieved with a low complexity decoder at the expense of a more complicated modem. An Ungerboeck coded system consists of a convolutional encoder and a signal mapper at the transmit end and a demodulator followed by a Viterbi algorithm processor at the receive end. The encoder and the mapper are designed to yield maximum power efficiency. Complexity of hardware implementation of the decoder for Ungerboeck codes depends on the required operating speed, the number of encoder states, and the code rate $R=k/n$. The code rate must be selected to minimize the complexity of branch metric computations. Although the theory and practice of multidimensional trellis codes are now mature (L. F. Wei, "Trellis-Coded Modulation with Multi-dimensional Constellations," IEEE Transactions on Information Theory, Vol. IT-33, No. 4, July 1987, pp. 483–501.), the decoder might become too complex if k and n are relatively prime and large numbers, e.g., $k=31$ and $n=36$. The multilevel coding method, proposed in 1977 by Imai and Hirakawa, (H. Imai and S. Hirakawa, "A New Multilevel Coding Method Using Error-Correcting Codes", IEEE Transactions on Information Theory, Vol. IT-23, No. 3, pp. 371–377.) (K. Yamaguchi and H Imai, "Highly Reliable Multilevel Channel Coding System Using Binary Convolutional Codes", Electronics Letters, Vol 23, No. 18, August 1987, pp. 931–933), is convenient for high speed implementation and, for a selected modulation signal space, allows a wide range for the code rate R.

Imai-Hirakawa Codes

In a multilevel/phase signal space the Euclidean distances between a particular signal point and the remaining points in the signal set are not equal. The distance between adjacent signal points (e.g. $\alpha_0$ and $\alpha_1$ in FIG. 3) is much smaller than the maximum distance between elements in the signal space, (e.g., $\alpha_0$ and $\alpha_4$). Therefore, more code redundancy must be allocated for encoding the adjacent signal points. Similarly, the information bits distinguishing between signal points far away from each other can be encoded by a high rate code or remain uncoded. Structure of the class of codes known as the Imai-Hirakawa codes is based on the above concept and they are generated by several encoders of various rates as indicated in FIG. 1. Low rate codes are used for encoding the adjacent symbols and high rate codes are selected for encoding the signal points located at a large distance from each other. For a signal space with $2^m$ elements, $C_i=(n, k_i, d_i), 1 \leq i \leq m$, constitute the set of m component block codes with a common code length n, where $R_i=k_i/n$ defines the code rate and $d_i$ denotes the minimum Hamming distance for the ith code. Both block codes and convolutional codes can be used as the component codes.

Generalized versions of the Imai-Hirakawa codes have been designed by Ginzburg (V. V. Ginzburg, "Multidimensional Signals for a Continuous Channel", Problemy Peredachi Informatsii (Problems of Information Transmission), Vol. 20, No. 1, 1984, pp. 28–46), and Sayegh (S. I. Sayegh, "A Class of Optimum Block Codes in Signal Space" IEEE Transactions on Communications, Vol. COM-34, No. 10, October 1986, pp. 1043–1045). In particular, Sayegh constructed specific block codes and explicitly exhibited the efficient multi-stage decoding procedure of FIG. 2 using Ungerboeck's set partitioning method. In the staged decoding procedure, the most error prone information bits are estimated first, using a posteriori probabilities based on the received channel symbols and the code structure. These estimates are then used in later decoding stages to determine estimates for the successively less error prone information bits.

Power and bandwidth efficient Imai-Hirakawa codes can be readily constructed, since the available optimum block/convolutional codes can be used as the component codes, (K. Yamaguchi and H. Imai, "Highly Reliable Multilevel Channel Coding System Using Binary Convolutional Codes", Electronics Letters, Vol 23, No. 18, August 1987, pp. 931–933). More importantly, available high speed decoders can be used in the multi-stage decoding procedure.

Despite the above advancements in satellite systems of the prior art, a satellite system compatible with the 155.52 Mbps data rate of the optical SONET system has not yet been developed. As discussed above, such a system would be highly desirable in order to interface the satellite communications systems with the optical communications systems.

SUMMARY OF THE INVENTION

A purpose and object of the present invention is to develop a B-ISDN compatible modem/codec (modulator/demodulator and coder/decoder) meeting the INTELSAT V link requirements and specifications and supporting transmission of 155.52 Mbps (OC-3 of the SONET hierarchy) of data over a single INTELSAT V/VA transponder.

Thus, the present invention involves the specific selection of coder/decoder rates and modulation/demodulation formats in order to accommodate the 155.52 Mbps data rate of the optical SONET network.

In the encoder, the 156 Mbps input stream is divided into four streams of 39 Mbps each. Each stream of 39 Mbps is then divided into three streams of 15, 14 and 10 Mbps, respectively. These last mentioned three streams are encoded by individual encoders in order to vary the amount of redundancy based on the signal space distance. Each of the three encoders outputs a stream of 15 Mbps. An OPSK mapper then receives the three 15 Mbps streams and converts them into a 15 Msymbol/s stream. The four 15 Msymbol/s streams are then combined into a 60 Msymbol/s stream for transmission over the communications channel. Corresponding circuitry is included at the receive end in order to substantially reconstruct the input 156 Mbps data stream.

BRIEF DESCRIPTION OF THE DRAWINGS

The details of the invention will become clear from the following detailed description of the preferred embodiment in conjunction with the following figures.

DETAILED DESCRIPTION OF THE PREFERRED EMBODIMENT

The below-described invention relates to coding and modulation techniques which are devised and selected for transmission of 155.52 Mbps of data over a single INTELSAT V/VA transponder with a usable bandwidth of 72 MHz. The proposed system consists of a multi-level encoder/decoder of rate 13/15 and an octal phase shift keying modem. In addition to meeting the INTELSAT V link requirements and specifications, the proposed system can operate in a fallback mode supporting transmission of 140 Mbps while achieving a higher coding gain. Transmission at such rates via satellite will ensure compatibility with broadband ISDN and hence secure a place for satellite transmissions in those standards.

Transmission at 155.52 Mbps calls for a bandwidth efficiency of about 1.94 bits/s/Hz or an improvement of 48% over the QPSK TDMA system. The required bandwidth efficiency cannot be achieved by QPSK modulation. Therefore, higher level modulation schemes such as OPSK or 16-ary signal constellations must be considered. The required bandwidth efficiency and power efficiency can be achieved by employing a powerful combined modulation and coding technique in which the code redundancy is embedded in a larger signal space than otherwise could be used in the uncoded case.

For a given information bit rate, fundamental parameters for a coded modulation system include the channel symbol rate, the code rate, R, the modulation scheme, and the expected error performance. For a selected signal space constellation, the code rate depends on the selected channel symbol rate and vice versa.

Among several candidate modulation schemes, octal phase shift keying (OPSK) is selected as the modulation format, because of its constant envelope and the achievable high power efficiency when combined with an appropriate code.

A transmission symbol rate of 60 Msymbol/s is preferred because of the following reasons. The QPSK TDMA system is operating at this rate. Hence, the available subsystems such as transmit and receive filters, equalizers, etc. can also be used in the B-ISDN system, thus reducing the overall unit cost. High level modulation schemes are sensitive to phase noise. Main sources of phase noise are the group delay distortion of pulse shaping and satellite multiplexing filters, AM/AM and AM/PM nonlinearities, residual phase modulation in high power amplifiers (HPAs), and the carrier phase noise. Group delay distortion of filters can be almost perfectly equalized when the channel symbol rate is 60 Msymbol/s or less. However, an equalizer for higher channel symbol rates might not perform as well.

A coded OPSK modulation of rate 31/36 can support transmission of 155 Mbps at a channel symbol rate of 60 Msymbol/s. The throughput of the system can be increased to 156 Mbps by using a code of rate $39/45 = 13/15$. The extra 0.48 Mbps capacity of the 156 Mbps channel can be used for synchronization purposes in various stages of the transmission link.

The preferred embodiment of the present invention consists of a block/convolutional Imai-Hirakawa code of rate 13/15 with an asymptotic coding gain of 3.5 Db. This code can support transmission at 156 Mbps with a channel symbol rate of 60 Mhz. This code has a variable rate feature. That is, a codec implemented for transmission of 156 Mbps can also be used for transmitting 140 Mbps data, as will be described below.

Figure 4:
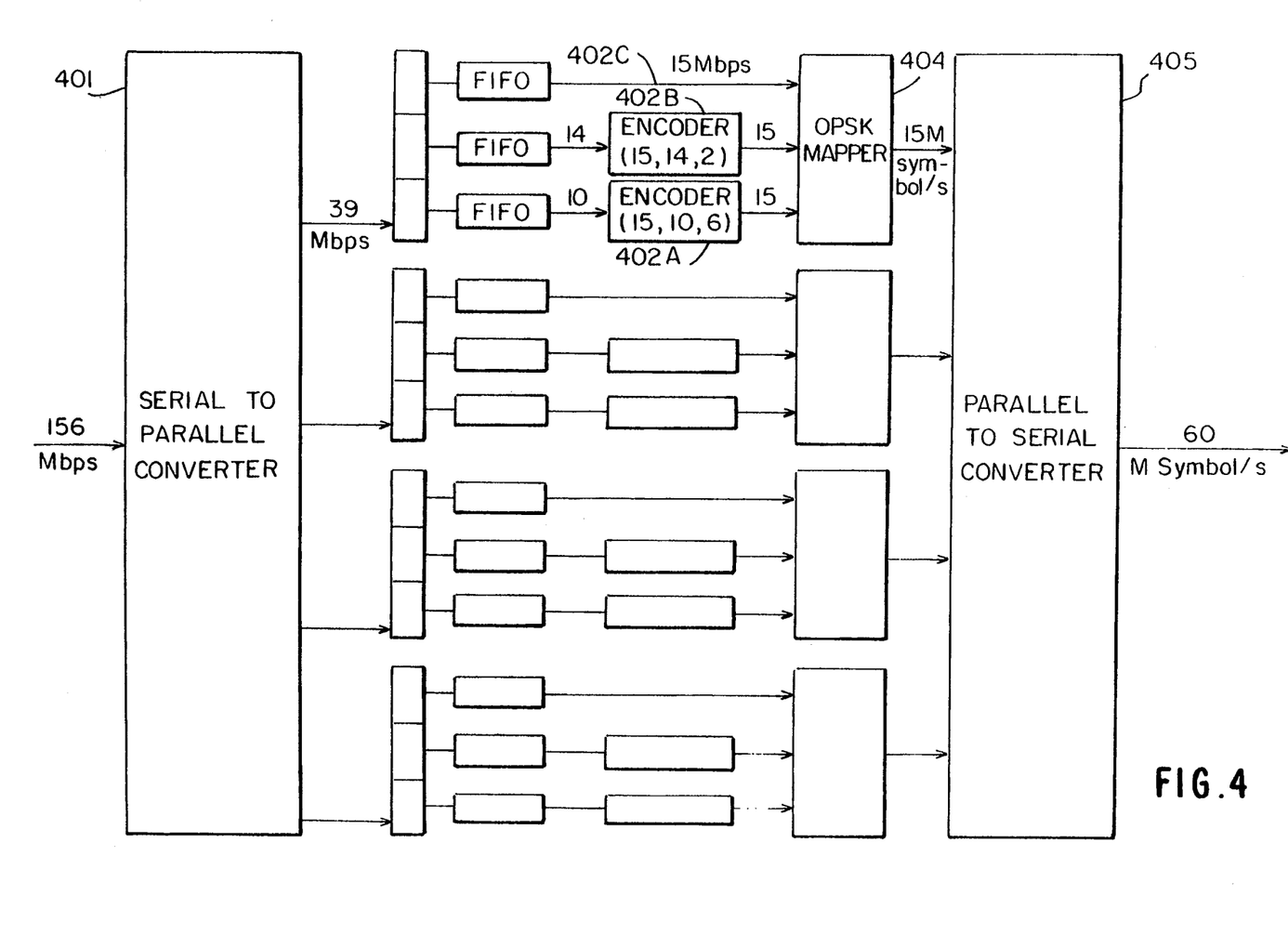
FIG. 4 shows a block diagram for the encoder of rate 13/15 according to the present invention.

FIG. 4 shows the encoder for the block/convolutional code of rate 13/15 of the present invention.

As shown in FIG. 4, an input data stream of 156 Mbps is provided to a serial-to-parallel converter 401 where the 156 Mbps stream is divided up into four parallel groups of 39 Mbps ($4 \times 39 = 156$). Each of the four parallel 39 Mbps data streams are sent to a respective coding system, with each system comprising three separate encoders. The outputs of the three separate encoders are arranged in a three-row by fifteen-column array. The first row of the array is a block of fifteen consecutive encoded bits, generated at the output of a punctured convolutional encoder 402A of FIG. 4 having rate $\frac{2}{3}$ and constraint length 7. Encoder 402A takes in 10 information bits and adds 5 more as redundant check bits. The tap connections for the original code of rate $\frac{1}{2}$ and the puncturing map are defined by J. B. Cain, G. L. Clark, and J. M. Geist, "Punctured Convolutional Codes of Rate (n−1)/n and Simplified Maximum Likelihood Decoding," IEEE Trans. Information Theory, Vol. IT.25, pp. 97–100, January 1979.

The second row of the array is a single parity check code of length 15 and rate 14/15 obtained from encoder 402B. Coder 402B takes in 14 information bits (of the 39) and adds 1 additional check bit, to give a total of 15 at the output of encoder 402B. The third row of the array is a block of 15 uncoded information bits, which is a code word in the universal (15,15,1) code of rate 1.

This third line 402C of each of the 39 Mbps parallel divisions is not subjected to an error correction/coding operation where redundant check bits are added. Instead, the 15 Mbps data is sent directly to the OPSK mapper 404.

Figure 3:
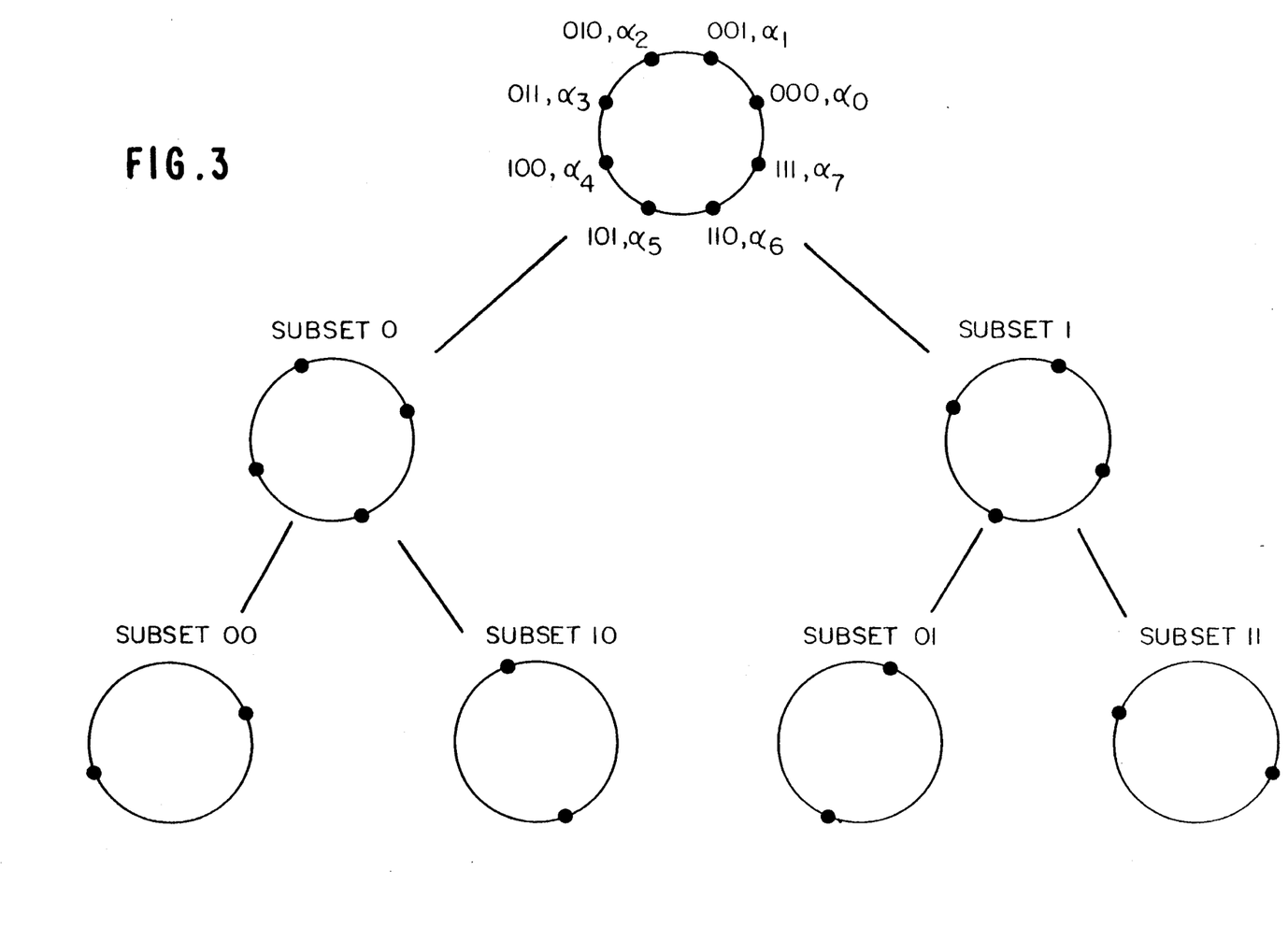
FIG. 3 shows an OPSK signal space and its subsets.

The 3 bits in each column of the array specify one of the points in the OPSK signal space of FIG. 3. The set of points in the OPSK signal space is partitioned into two subsets: subset 0 and subset 1. The encoder/mapper selects an element in subset 0 if the corresponding bit in the first row of the array is a 0. Otherwise, a column of the array is mapped into one of the elements in subset 1. Partitions of the OPSK geometry are also shown in FIG. 3. Subsets 0 and 1 are QPSK signal points, having the least significant bits 0 and 1, respectively (the least significant bits are the encoded bits in the third row of the array). Similarly, subsets 00, 01, 10, 11 are antipodal signal points having 00, 01, 10, or 11 as mid- and least significant bits in the OPSK signal constellation.

Mapper 404 receives the 15 Mbps outputs from encoders 402A and 402B. and on line 402C. The mapper 404 takes the input information and maps it onto a particular channel symbol which is then used to control modulation of a carrier, as is well known. According to the preferred embodiment, octal phase shift keying (OPSK) is used. Thus, each mapper 104 outputs 15 Msymbol/s. A parallel-to-serial converter 405 receives each of the 15 Msymbol/s and combines these into serial form, resulting in a 60 Msymbol/s data stream capable of being transmitted over the transmission channel.

Figure 5:
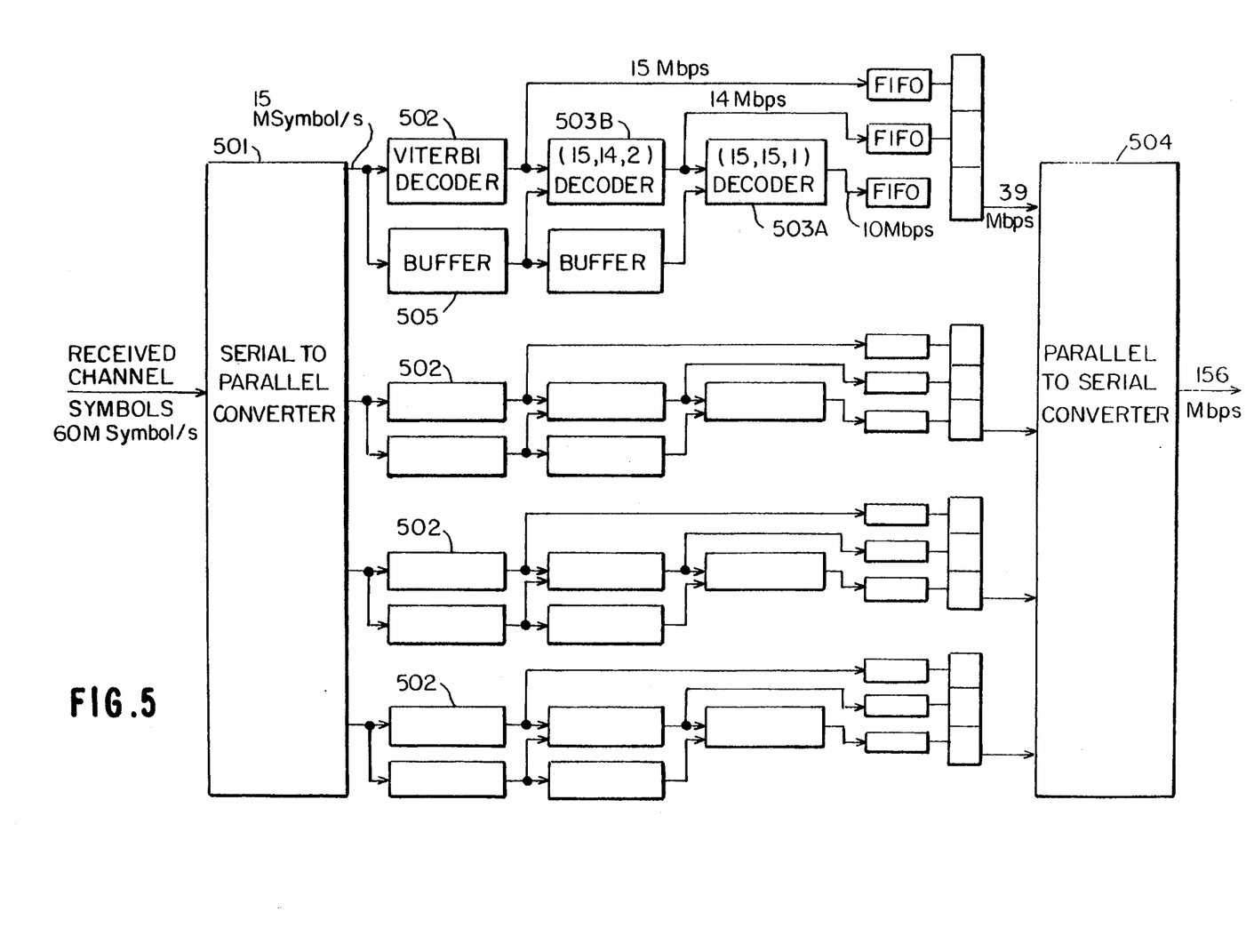
FIG. 5 shows a block diagram for a decoder of rate 13/15 according to the present invention.

At the receive end of the transmission channel, the 60 Msymbol/s signal is received by a decoder/demodulator as shown in FIG. 5. Specifically, a serial-to-parallel converter 501 receives the received signal and converts the serial signal into 4 groups of parallel symbols, each group having 15 Msymbol/s.

Decoding is performed in 3 stages. In the first stage, it is assumed that the second and third row of the array are uncoded information bits. In this case, estimates for the information bits in the first row of the array can be obtained by feeding the symbol metrics to the input of a Viterbi decoder 502 for the code used in the first row of the array.

Estimates for the information bits in the second row of the array are obtained by performing single parity check decoding on a set of new symbol metrics. The new set of symbol metrics is computed by assuming that the output of the first decoding stage was correct. For decoding the third row of the array, a set of new metrics is computed, by again assuming that the decisions made in the previous decoding stages were correct. The polarity of the new metrics determines the new information bits in the third row of the array, since the information bits in this row are not coded.

The above multi-stage method is a sub-optimum decoding procedure and it allows reduction in the number of required quantization bits. Methods for computing the symbol metrics in various decoding stages are presented in a later section of this disclosure.

When implemented in hardware, the Viterbi decoder 502 in the first decoding stage must operate at 60 MHz. Hardware implementation of a 64-state code operating at 60 MHz is currently a technology challenge. However, the considered codec can be readily implemented for operation at the desired speed by demultiplexing the 156 Mbps serial information bit stream into a plurality of parallel sequences. For purposes of illustration, the data sequence is demultiplexed into four parallel bit streams (39 Mbps each), and a separate encoder arrangement is used for the component sequences as indicated in FIGS. 4 and 5. The block diagrams of FIGS. 4 and 5, in addition to the convolutional and parity check encoders (i.e., 402A and 402B) and OPSK signal mapper 404, include circuitry for serial-to-parallel (i.e., 401) and parallel-to-serial (405) conversion, as well as high speed buffers (505) and bit rate converters (401 and 405). The multiplexer/demultiplexer operations are performed so that the structure of the 155.52 Mbps information sequence remains unchanged.

In the FIG. 5 block diagram of the decoder/demultiplexer, the received sequence of channel symbols is serial-to-parallel converted by element 501 and after metric calculation, is fed to four separate Viterbi decoders 502. Decoders for the K=7 code are available on a single chip and can operate at information rates up to 25 MHz. Other circuitry for implementation of the decoder of FIG. 5 includes serial-to-parallel and parallel-to-serial converters 501 and 504 symbol rate converters (501 and 504), high speed buffers 505 and parity check decoders 503A and 503B, finally, control and synchronization circuits. The control and synchronization circuits are described in a publication entitled "A B-ISDN Compatible Modem/Codec" by F. Hemmati and S. Miller. (The above disclosure was presented at the Second Annual NASA Space Communications Technology Conference, Nov. 12–14, 1991, Cleveland, Ohio). The main advantage of the selected code and this implementation approach is the simplicity of implementation of the decoder because of the availability of the high speed single chip Viterbi decoders.

In FIG. 5, decoders 503A and 503B perform the complementary operation to encoders 402A and 402B, respectively. The decoded sequences of 15, 14, and 10 Mbps are then combined into a 39 Mbps sequence for each of the four parallel branches in FIG. 5. Then, parallel-to-serial converter 504 receives the four sequences of 39 Mbps each and combines the four into a single 156 Mbps sequence, which approximates the 156 Mbps sequence originally input to the serial-to-parallel converter 401 of the encoder/multiplexer of FIG. 4.

Encoder and decoder configurations shown in FIGS. 4 and 5 require accurate synchronization for the S/P demultiplexers at the transmit and receive end in addition to phase ambiguity resolution for the OPSK channel symbols. The desired synchronization can be achieved by either using a self-synchronization scheme, or by unique words periodically inserted into the 155.52 Mbps information sequence.

In the self-synchronization method, the outputs of the component decoders are re-encoded and correlated with the received sequence of channel symbols. The codec is in synchronization status if a good correlation between the received sequence and the re-encoded sequence is observed. Otherwise, the receiver skips one symbol and repeats the synchronization check cycle until synchronization is obtained. Because of the high rate of the code, the startup delay and traceback delay of the decoder, and the required correlation time for synchronization verification, the resynchronization delay of the decoder can be as large as the time duration for receiving 10,000 channel symbols or about 0.2 ms, which might be acceptable for continuous mode operation if the cycle skipping rate is not too high.

Synchronization and phase ambiguity resolution by using a unique word provides a fast synchronization and allows the codec/modem to be used for operation in continuous mode (TDM) or burst mode (TDMA). At a channel symbol rate of 60 Msymbol/s a code of rate 13/15 can support 156 Mbps, which is 0.48 Mbps higher than the nominal B-ISDN bit rate. This additional 0.48 Mbps can be conveniently used for synchronization purposes. In the proposed system, the codec/modem still accepts the continuous 155.52 Mbps SONET bit stream as its direct input. The unique word, used by the codec/modem system for synchronization purposes, can be generated periodically and multiplexed in with the encoded SONET bit stream. The decoder can then remove the unique word, as it recreates the decoded serial 155.52 Mbps data, at its output.

Metric Computation

The Viterbi decoder chip, considered for use in the 156 Mbps decoder, works with 3 bit soft detected channel symbols. Computer simulations and hardware implementation of the OPSK modulation coded at rates 7/9 and 8/9, indicate that the received OPSK channel symbols should be quantized to at least 5 bits, so that the degradations in the bit error rate performance become negligible compared with the BER performance of a codec using unquantized channel symbols. This section presents a procedure for branch metric computation, which is suitable for the Viterbi decoder chip, and its BER performance is within a few tenths of a dB of the BER performance with infinite levels of quantization.

Unquantized Case

Symbol metric is an indicator of reliability of a received channel symbol, $R=(x,y)$, where x and y are unquantized quadrature components of R. The optimum symbol metric is the minimum Euclidean distance between R and elements in the subsets 0 and 1 of FIG. 6. Over an Additive White Gaussian Noise (AWGN) channel, computation of symbol metrics by using the minimum Euclidean distance can be reduced to computation of the largest correlation between the received symbol and the OPSK signal points.

Figures 6, 7, 8:
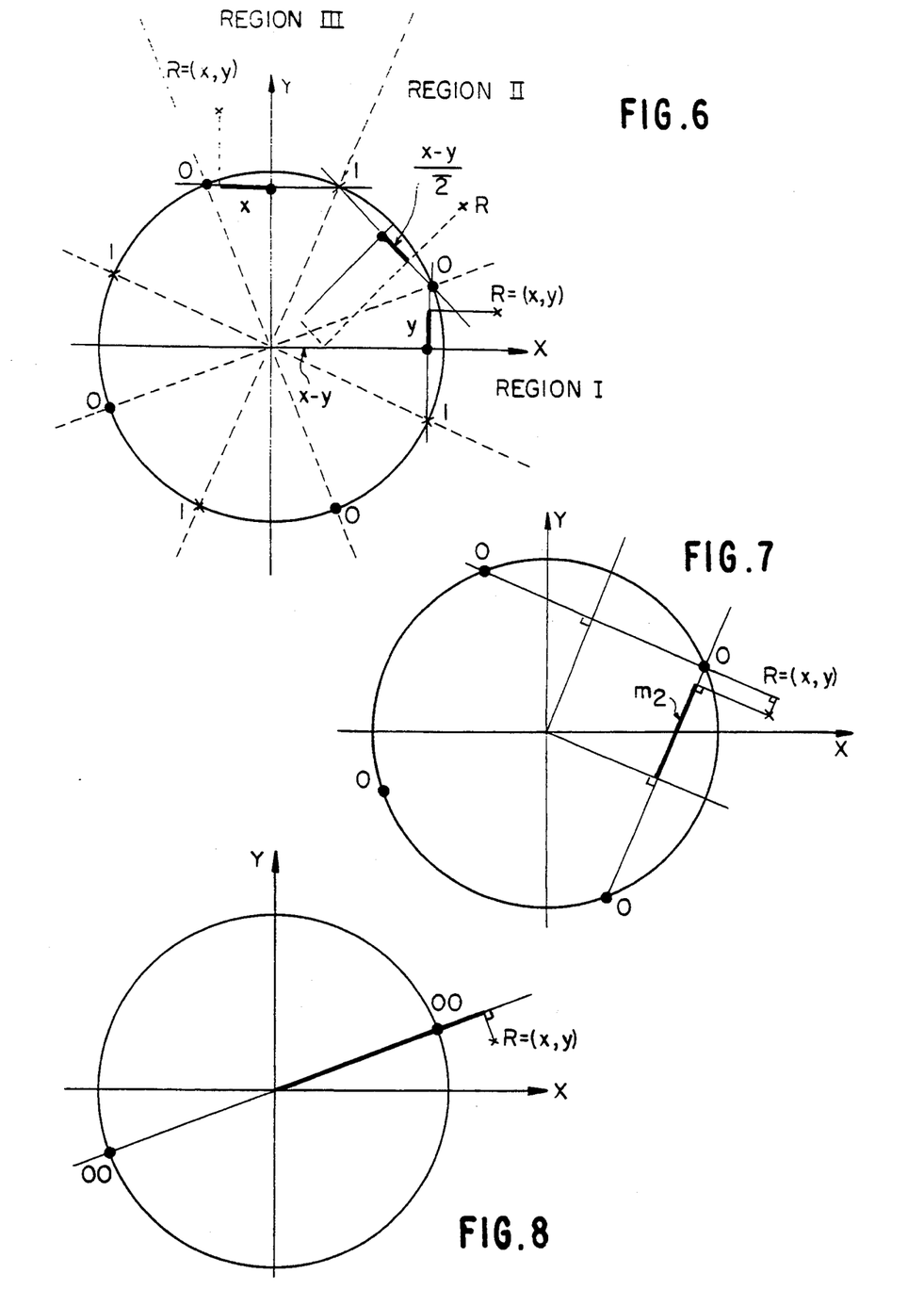
FIG. 6 shows a symbol metric for the first decoding stage.
FIG. 7 shows a symbol metric for the second decoding stage.
FIG. 8 shows a symbol metric for the third decoding stage.

Correlations of a received channel symbol R, falling in region I of FIG. 6, with its nearest signal points, $a_0=(a,b)$ and $a_7=(a,-b)$, are $$R \cdot a_0 = a \cdot x + b \cdot y \qquad (1)$$

and, $$R \cdot a_7 = a \cdot x - b \cdot y, \qquad (2)$$

where, the coordinates of the OPSK signal points are $a=\cos 22.5=0.9238$, and $b=\sin 22.5=0.3826$, with a normalized envelope of 1. The computed symbol metrics can be reduced to y and $-y$ by deleting the common term $a \cdot x$ in both of the above equations and dividing by b. It can be seen from FIG. 6 that y is the projected distance of R from the middle of the line connecting $a_0$ and $a_7$. Similarly, it can be shown that the symbol metrics are x and $-x$ if $R=(x,y)$ falls in region III of FIG. 6. Metrics for symbols falling in region II of FIG. 6 can be obtained in a similar manner by rotating the signal space by 45 degrees. Metrics for received channel symbols in other regions of FIG. 6 are computed in a similar manner by using symmetries in FIG. 6. Therefore, over a Gaussian channel, the optimum symbol metric is the projected distance of the received point R from the middle of the line connecting its nearest signal points. Using the geometry of FIG. 6, it can readily be shown that for a received R, the symbol metric for the first decoding stage is $$m_1 = \rho \cdot \min\left(|y|, \frac{|x|-|y|}{\sqrt{2}}\right), \text{ if } |x| > |y| \qquad (3)$$

otherwise, $$m_1 = -\rho \cdot \min\left(|x|, -\frac{|x|-|y|}{\sqrt{2}}\right), \qquad (4)$$

where $\rho=+1$ if R falls in the first or third quadrants and $\rho=-1$ if R falls in the second or fourth quadrants. It is assumed, in Equations (3) and (4), that the symbol metric is positive if R is close to subset 0 and negative, otherwise.

The sequence of estimates for information bits in the first row are re-encoded and stored in a buffer. A re-encoded symbol 0 (1) indicates that the corresponding received channel symbol, R, belongs to subset 0 (1). For a considered $R=(x,y)$, let the reencoded symbol be $c_1=0$. Then, the symbol metric for the second decoding stage, $m_2$, is the projected distance of R from the middle of the line connecting the two closest points to R in subset 0, as indicated in FIG. 7. Using the geometry of FIG. 7, and some calculus, it can be shown that $$m_2 = p \cdot \min(|Z_1|, |Z_2|) \qquad (5)$$

where, $$Z_1 = a \cdot x - s \cdot b \cdot y$$

$$Z_2 = s \cdot b \cdot x + a \cdot y,$$

and where, $$s = \begin{cases} +1 \text{ if } c_1 = 0 \\ -1 \text{ if } c_1 = 1 \end{cases}$$

and $$p = \begin{cases} +1 \text{ if } Z_1 \cdot Z_2 > 0 \\ -1, \text{ Otherwise} \end{cases}$$

The sequence of estimates for information bits in the second row of the array are re-encoded and stored in a buffer. For a given received symbol R, let the re-encoded symbol be $c_2$. Then, the corresponding estimate for the re-encoded bit in the first and second row of the array, $c_1$ and $c_2$, indicates that R belongs to the subset $c_1 c_2$. FIG. 8 shows the configuration of the selected subset when $c_1 c_2 = 00$. The symbol metric for the third decoding step, $m_3$, is the projected distance of R from the middle of the line connecting the two BPSK points in this subset.

$$m_3 = u \cdot x - v \cdot y,$$

where (u,v) are coordinates for one of the signal points in subset $c_1 c_2$. The variables u and v are $\mp a$ or $\mp b$, represent one of the four points in the upper half plane in the OPSK signal space, and can be computed by using a table-look-up. Estimates for information bits in the third row of the array are the "sign bit" of $m_3$, i.e., $c_3=0$ if $m_3>0$, and $c_3=1$, otherwise.

The symbol metrics $m_2$ and $m_3$, given in Equations (5) and (6), are independent of $m_1$, the symbol metric for the Viterbi decoder, and can be computed by using any desired number of quantization levels.

Quantized Case

Algorithms for computing the optimum spacing between quantization levels in a coded modulation system have been formulated by Massey (J. L. Massey, "Coding and Modulation in Digital Communications", Proc. Int. Zurich Seminar Digital Communication, Zurich, Switzerland, 1974.). The optimum quantization levels, given in Massey's publication, depend on the $E_b/N_0$ and maximize the computational cutoff rate, $R_0$. Analysis and hardware measurements for optimum spacing between quantization levels, in a uniform quantizer, for codes of rate ½ and ¾ are reported by Y. Yasuda, et al., "Optimum Soft Decision for Viterbi Decoding", Proc. Fifth Int. Conf. Digital Satellite Communication, Genoa, Italy, March 1981, pp. 251-258. The theoretical results of Massey and the experimental results of Yasuda, et al. indicate that in the unreliable regions, i.e., at low SNR, a larger spacing between quantization levels is required than in the reliable regions, i.e., at high SNR.

Instead of attempting to devise an optimum scheme, two different nonlinear quantization methods are examined. The first method consists of the quasi-uniform quantizers depicted in FIGS. 9 and 10, followed by a non-linear compression method for representing the channel symbols by 3 bits. The second quantization method, presented in the next section, uses properties of the OPSK signal constellation to reduce the required number of quantization levels.

The Quantization/Nonlinear Compression Method

Figure 9:
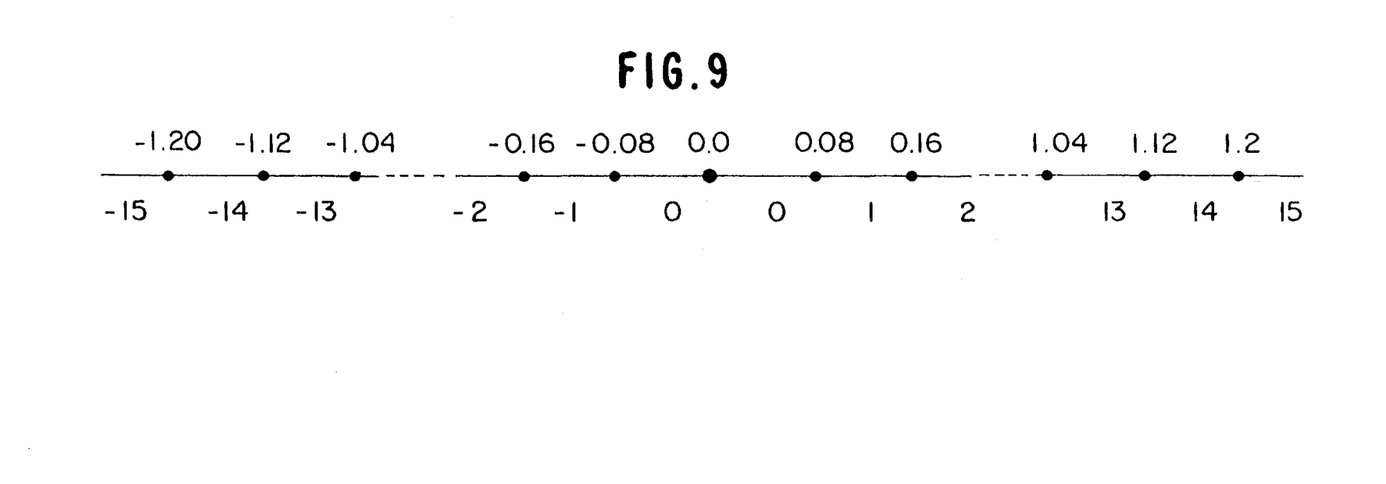
FIG. 9 shows a 32-level (5-bit) quasi-uniform quantizer.
Figure 10:
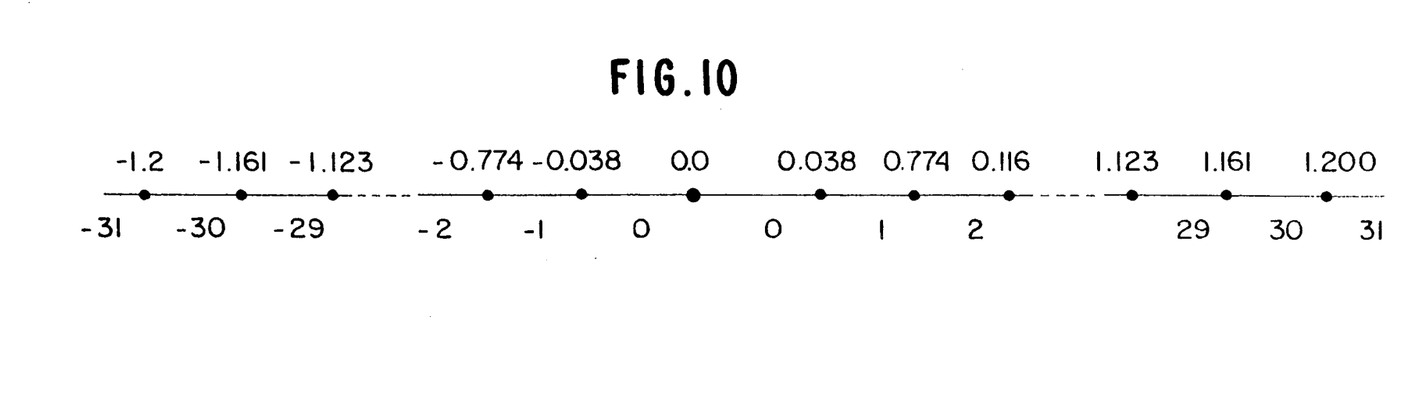
FIG. 10 shows a 64-level (6-bit) quasi-uniform quantizer.

Before considering the symbol metric compression scheme, properties of the quantizers shown in FIGS. 9 and 10 are identified when using Equation 3 or 4. Notations used in the previous section are conveniently capitalized for representing the quantized values, e.g., $M_1$ denotes the quantized value of $m_1$.

Regarding the absolute value of $M_1$, it can be seen from Equations 3 and 4 that either, $$|M_1| = \min(|X|, |Y|)$$

or $$|M_1| = \left| \frac{|X| - |Y|}{S_q(2)} \right|.$$

where $S_q(2)$ denotes the quantized value for $\sqrt{2}$. Table 1 shows the quantized values for $||x| - |y||/\sqrt{2}$ used in the computer simulations.

TABLE 1

| Quantized Value of $||x|-|y||/\sqrt{2}$ | |
| --- | --- |
| $\|\|x\| - \|y\|\|$ | 0 1 2 3 4 5 6 7 8 9 10 11 12 13 |
| $\|\|x\|-\|y\|\|/\sqrt{2}$ | 0 1 2 2 3 4 4 5 6 6 7 8 8 9 |
| $\|\|x\| - \|y\|\|$ | 16 17 18 19 20 21 22 23 24 25 26 27 28 29 |
| $\|\|x\|-\|y\|\|/\sqrt{2}$ | 11 12 13 13 14 15 15 16 17 18 18 19 20 20 |

Let estimates for quadrature components of the received channel symbol, x and y, generated at the output of the OPSK demodulator, be quantized by a 32-level (5-bit) quantizer with a normalized top quantization level of $T_q = 1.2$, as shown in FIG. 9. Variations in $T_q$ correspond to variations in the AGC levels and its effects on the BER performance of the code are investigated later in this section.

It can be readily verified, by exhaustive search, that in the range of all possible received channel symbols $$\max|M_1| = 6 < 2^3 - 1. \tag{7}$$

Also, $$\max|M_1| = 13 < 2^4 - 1 \tag{8}$$

if the 64 level (6 bit) quantization of FIG. 10 is used. It is evident from Equations (7) and (8) that $M_1$ can be represented by 4 or 5 bits while the quadrature components of the received channel symbol are represented by 5 or 6 bits, respectively. This reduction in the required number of quantization levels is possible because of the preprocessing made in Equations (3) or (4).

The symbol metric, $M_1$, must be compressed to 3 bits, from 4 or 5 bits, by using an appropriate metric compression scheme. The optimum compression method yields the best BER performance. The considered candidate compression schemes use the nonlinear compression methods of Table 2 or Table 3 when using the quantizers of FIGS. 9 or 10.

TABLE 2

| A Nonlinear Compression Method when $0 \leq \|M\| \leq 6$ | | | | | | | |
| --- | --- | --- | --- | --- | --- | --- | --- |
| $\|M_1\|$ | 0 | 1 | 2 | 3 | 4 | 5 | 6 |
| Compressed Value of $\|M_1\|$ | 0 | 1 | 2 | 2 | 3 | 3 | 3 |

TABLE 3

| A Nonlinear Compression Method when $0 \leq \|M\| \leq 13$ | | | | | | | | | | | | | | |
| --- | --- | --- | --- | --- | --- | --- | --- | --- | --- | --- | --- | --- | --- | --- |
| $\|M_1\|$ | 0 | 1 | 2 | 3 | 4 | 5 | 6 | 7 | 8 | 9 | 10 | 11 | 12 | 13 |
| Compressed Value of $\|M_1\|$ | 0 | 0 | 1 | 1 | 1 | 2 | 2 | 2 | 2 | 3 | 3 | 3 | 3 | 3 |

Extensive computer simulations indicate that the 64 level quantization scheme of FIG. 10 along with the nonlinear compression method of Table 3 outperforms the other candidate quantization/compression schemes.

Quantization by Symbol Rotation

Figure 11:
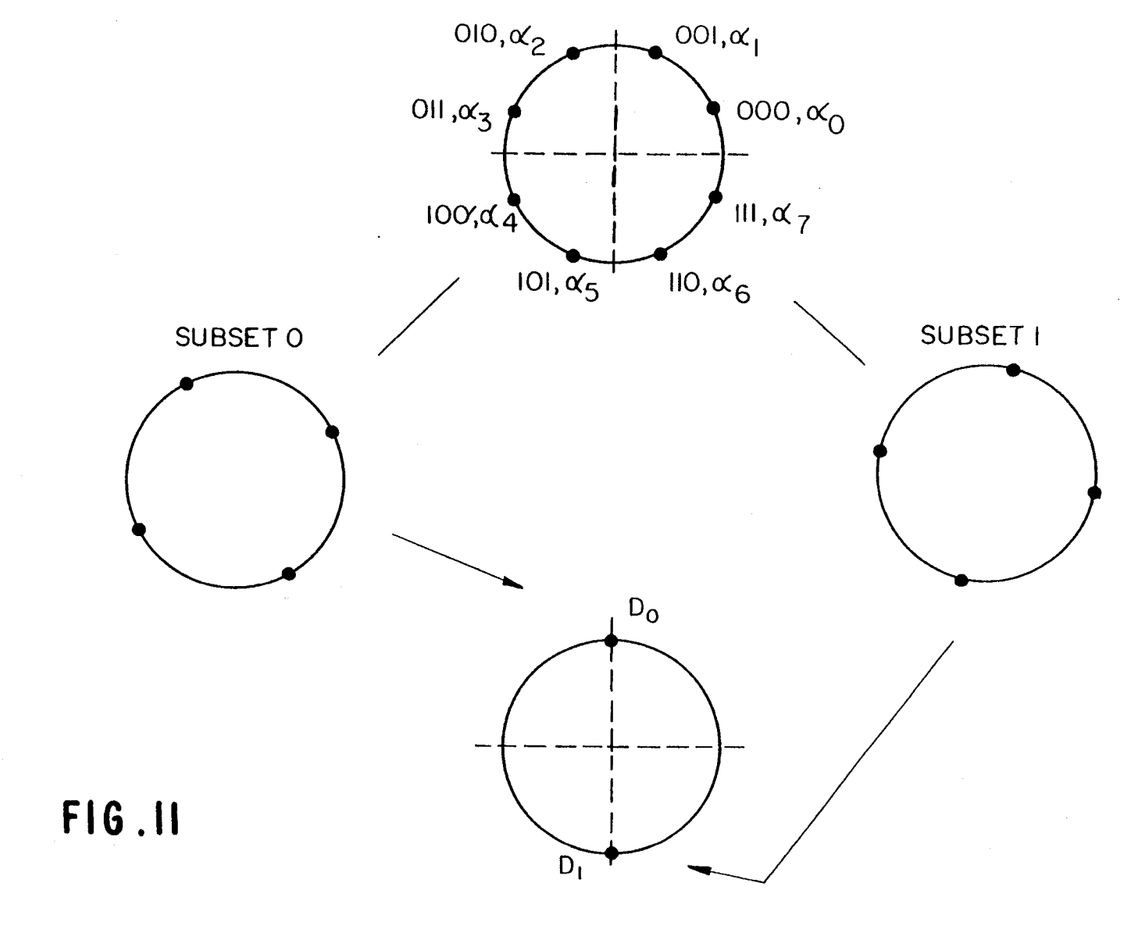
FIG. 11 shows an octal PSK signal space and the non-linear map of its subsets.

Another method for computing the symbol metrics is to remove the OPSK modulation from the received channel symbols. Let $(\rho, \phi)$ be the polar representation of the eight signal points in the OPSK signal space where, $\rho = 1$ and $\phi = i \times \pi/8$, $i = 1, 3, 5, \ldots, 15$. The nonlinear transformation $\rho e^{j4\phi}$ maps elements in the subset 0 of FIG. 11 to $D_0$ and maps elements in subset 1 to $D_1$. Indeed, this mapping rotates the OPSK signal points around a circle of radius one. The image point $D_0$ and $D_1$ can be considered as signal points in a BPSK modulation. Therefore, metrics for the first decoding stage can be readily computed by applying the nonlinear transformation $\rho e^{j4\phi}$ to the received channel symbols and calculating metrics in a BPSK signal space.

The nonlinear transformation improves quantization accuracy because it removes the OPSK modulation from the received channel symbols and a three bit soft quantization provides sufficient resolution for distinguishing between the obtained BPSK signal points.

Expected Bit Error Rate Performance

The BER performance of the OPSK coded modulation of rate 13/15 for transmission of 156 Mbps, was evaluated by computer simulations. The 64 level quantizer of FIG. 10 in conjunction with the compression method of Table 3 were used. Over an AWGN channel and at a BER of $10^{-5}$ the BER performance of this scheme is within 0.2 dB of the performance of the coded system using unquantized channel symbols.

Figure 12:
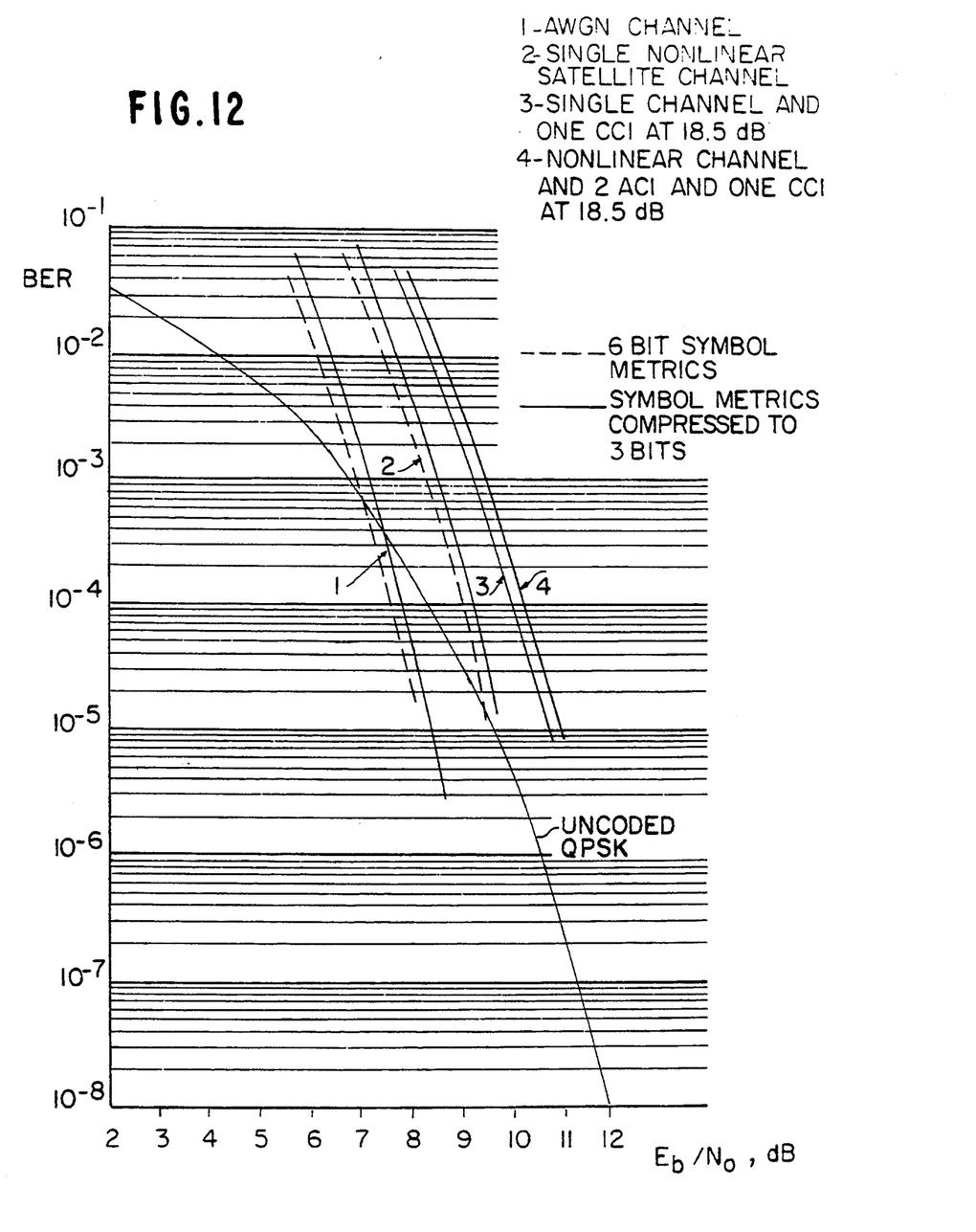
FIG. 12 shows the bit error rate performance of the code of rate 13/15 over a non-linear satellite channel.

Bit error rate performance results over an AWGN channel and a typical INTELSAT V nonlinear channel are shown in FIG. 12. FIG. 12 relates to a 64-state multi-stage code of rate 13/15. Further, FIG. 12 concerns ideal group delay equalized filters and earth station HPA and satellite TWTA at 10 and 2 dB Input Back-Off (IBO), respectively. In FIG. 12, the numeral 1 concerns an AWGN channel. Numeral 2 relates to a single nonlinear satellite channel. Numeral 3 relates to a single channel and one CCI (co-channel interference) at 18.5 dB. Numeral 4 relates to a nonlinear channel and 2 ACI and one CCI (co-channel interference) at 18.5 dB. Further, FIG. 12 concerns 6 bit symbol metrics (dotted lines) and symbol metrics compressed to 3 bits (solid lines). The system environment and performance parameters considered in the computer simulations are summarized in Table 4.

TABLE 4

Summary of System Variables and
Assumptions Used in the Computer Simulations

| | |
|---|---|
| Number of Samples per Symbol | 16 |
| HPA Input Backoff, dB | 10 |
| Satellite TWTA Input Backoff, dB | 2 |
| Cochannel Interference Level, dB | 18.5 |
| Separation Between Adjacent Channels, MHz | 80 |
| Roll-Off Factor for Square-Root Nyquist Modem Filters | 40% |
| Ideally Group Delay Equalized Filters | |
| Perfect Symbol Phase and Symbol Timing | |

For the AWGN channel, a coding gain of 1.2 dB over uncoded QPSK is observed at a BER of $10^{-5}$. An effective coding gain of about 2.5 dB is expected at a BER of $10^{-8}$ which can be obtained by extrapolating the BER performance curve of FIG. 12. The 1.08 dB discrepancy between the 3.58 dB asymptotic coding gain for this code, and the effective coding gain of 2.5 dB, is due to the adversary path multiplicity in the K=7 punctured convolutional code of rate $\frac{2}{3}$, sub-optimum multistage decoding (instead of maximum likelihood decoding), and the three bit soft-decision quantization (instead of infinite number of quantization levels).

At a BER of $10^{-4}$ performance of the single nonlinear satellite channel degrades by about 1.5 dB relative to the performance of the AWGN channel, which is due to the link nonlinearities and ISI. The BER performance degrades by an additional 1 dB with one entry of CCI at a power level of 18.5 dB with respect to the desired channel. The two 60 Msymbol/s adjacent channels located at +80 MHz and −80 MHz, relative to the center frequency of the desired channel, degrade the BER performance by an additional 0.3 dB.

The BER performance results shown in FIG. 12 are obtained by assuming that the group delay distortion of the modem filters and satellite multiplexing filters are ideally equalized. In a real channel, phase noise caused by the carrier oscillator, link nonlinearities, and group delay distortion of filters degrade the system performance. At a BER of $10^{-4}$, the degradations due to the unequalized group delay distortion can be as much as 0.8 dB. Fortunately, over the real satellite channel, degradations due to phase noise resulting from the above-mentioned sources is not as severe. At a channel symbol rate of 60 Msymbol/s, over a usable bandwidth of 72 MHz, group delay distortion of the filters can be perfectly equalized.

Variable Rate Feature of the Decoder:

The codec designed for transmission of 156 Mbps can also be used in the fallback mode yielding a higher coding gain. For example, the inherent flexibility of the punctured codes allows the same codec to be used for transmission of 140 Mbps.

A coded OPSK modulation system of rate 7/9 can support transmission of 140 Mbps at a channel symbol rate of 60 Msymbols/s, and can be implemented by modifying the 156 Mbps codec in the following manner. The punctured code of rate $\frac{2}{3}$ is replaced by a code of rate 6/15=2/5. A code of rate 2/5 can be obtained from the original constraint length 7 convolutional code of rate $\frac{1}{2}$ by simply repeating twice one of the rate $\frac{1}{2}$ encoder output bits at every other encoding step. For simplicity of hardware implementation, n=15 is considered for the block length of the parity check codec in the second stage of the codec.

The free distance of the original code of rate $\frac{1}{2}$ is 10 and the free distance for the time-varying code of rate 2/5 is 11. The minimum squared Euclidean distance of the 140 Mbps coded OPSK system is $$d^2_m = \min(0.585 \cdot 11, 2.0 \cdot 2, 4.0 \cdot 1) = 4.0 \quad (9)$$

where 0.585, 2, and 4 are minimum squared Euclidean distance between OPSK, QPSK, and BPSK signal points. It can be seen from Equation (9) that $d_m^2$ is dominated by two times the minimum Euclidean distance among QPSK symbols or the squared distance between the BPSK signal points. Therefore, this code affords an asymptotic coding gain of 3.6 dB over the uncoded QPSK.

Another way of generating a code of rate 2/5 is to puncture an original code of rate $\frac{1}{3}$. This approach is preferred when high speed decoders for rate $\frac{1}{3}$ codes with code puncturing capability are available.

The BER performance of the coded modulation systems of rate 7/9, constructed by the above procedures, were examined by computer simulations. The symbol metrics are computed by using the 64 level quantizer of FIG. 10 and the nonlinear compression method of Table 3. However, since the Viterbi chip accepts at most two channel symbols at each decoding step, (for rate $\frac{1}{2}$ decoding), the metrics of the twice repeated symbols are averaged before being fed into the decoder chip.

Figure 13:
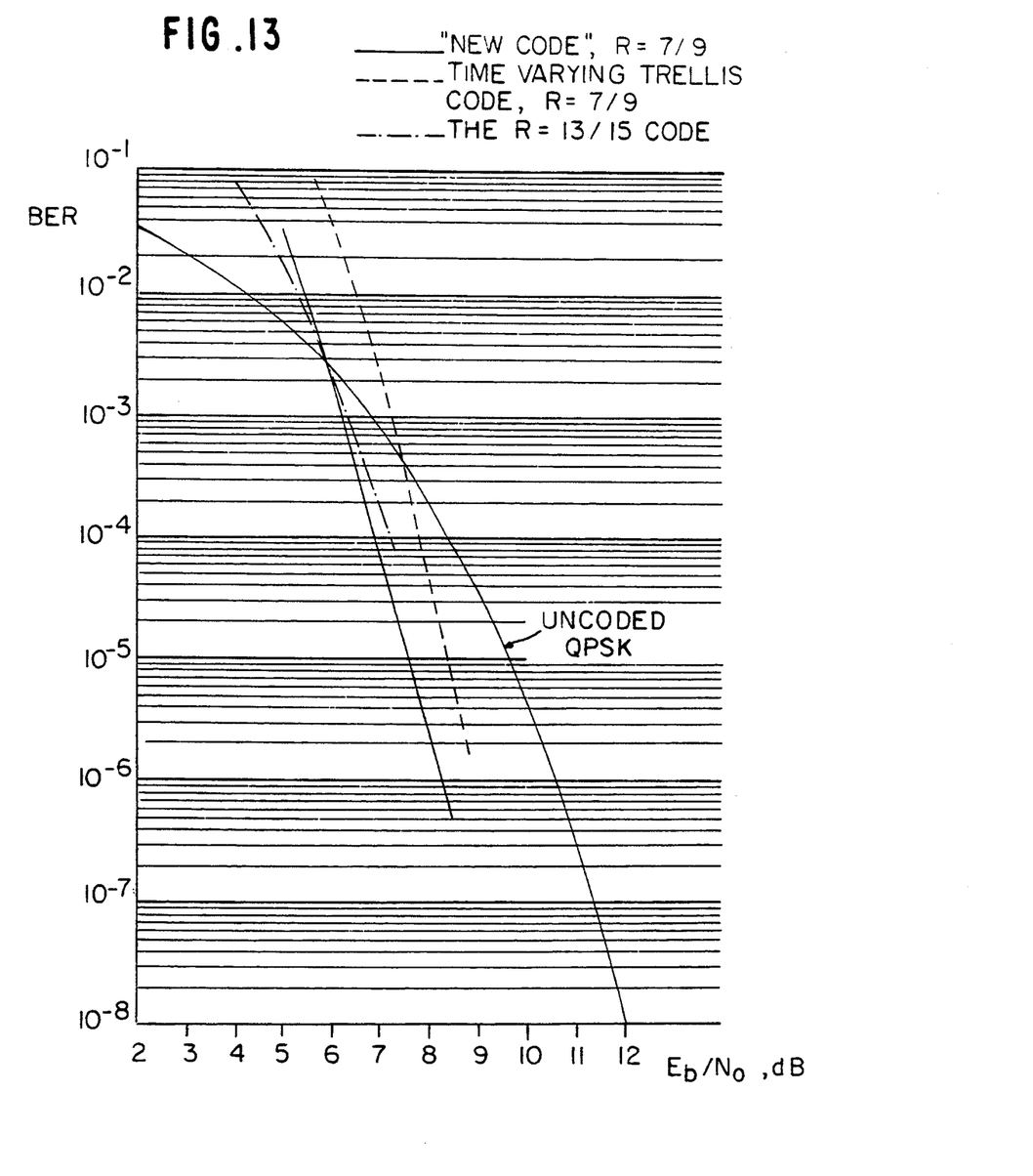
FIG. 13 shows the bit error rate performance of the coded OPSK modulation of rate 7/9 over an AWGN channel using a 64-level quantizer for received channel symbols.

FIG. 13 shows the computer simulation results obtained for the OPSK code of rate 7/9. The solid line in FIG. 13 relates to a "new code" having a rate R=7/9. The dotted line relates to time varying trellis code of rate R=7/9. The chained line relates to a rate of R=13/15 code. At high SNR, the BER performance of this code is dominated by the performance of the parity check decoder in the second decoding state since $d^2_m$ equals two times the minimum distance among QPSK signal points or the squared distance between BPSK symbols. The BER curves representing the performance of the 140 Mbps time varying trellis code of rate 7/9, (F. Hemmati and R. Fang, "Low Complexity Coding Methods for High-Data-Rate Channels", Comsat Technical Review, Vol. 16, No. 2, Fall 1986, pp. 425–447), and the 156 Mbps decoder are also shown in this figure. With a significantly less complex decoder, the new codes outperform the time varying trellis code of rate 7/9.

What is claimed is:

1. A digital information transmission apparatus comprising:
   first conversion means for converting a serial input data stream of bit rate 156 Mbps into four parallel data streams of 39 Mbps each;

encoder means for separately encoding each of the four parallel data streams, each said encoder means including first code-forming means for forming a code involving 15 output bits for each 10 input bits, second code-forming means for forming a code involving 15 output bits for each 14 input bits, and third code-forming means for forming a code involving 15 output bits for each 15 input bits;

means for combining to combined outputs from said encoder means for generating channel symbols; and second conversion means for converting said channel symbols into a single channel symbol serial data stream for transmission to a receiver.

2. A digital information transmission apparatus comprising:

first conversion means for converting a serial input data stream of bit rate 156 Mbps into four parallel data streams of 39 Mbps each;

encoder means for separately encoding each of the four parallel data streams;

means for combining outputs from said encoder means for generating Octal Phase Shift Keying (OPSK) channel symbols; and second conversion means for converting said channel symbols into a single channel symbol serial data stream for transmission to a receiver.

3. A digital information transmission apparatus comprising:

first conversion means for converting a serial input data stream of bit rate 156 Mbps into four parallel data streams of 39 Mbps each;

encoder means for separately encoding each of the four parallel data streams;

means for combining outputs from said encoder means for generating channel symbols; and second conversion means for converting said channel symbols into a single channel symbol serial data stream having a rate of 60 Msymbol/s for transmission to a receiver.

* * * * *